United States Patent [19]

Santen

[11] 4,352,423
[45] Oct. 5, 1982

[54] CONVEYING APPARATUS

[75] Inventor: Salomon Santen, Amsterdam, Netherlands

[73] Assignee: Stork Amsterdam B.V., Netherlands

[21] Appl. No.: 174,175

[22] Filed: Jul. 31, 1980

[30] Foreign Application Priority Data

Aug. 1, 1979 [NL] Netherlands ............... 7905925

[51] Int. Cl.³ .............................................. B65G 37/00
[52] U.S. Cl. ..................................... 198/472; 99/362; 198/482; 198/648; 198/703
[58] Field of Search ............... 198/701, 705, 708, 472, 198/482, 648, 703; 99/360, 362

[56] References Cited

U.S. PATENT DOCUMENTS 1,837,605 12/1931 Baker .................................. 198/472
3,347,351 10/1967 Mencacci ........................ 198/482 X
4,015,935 4/1977 Anderson ......................... 99/362 X

FOREIGN PATENT DOCUMENTS

6817306 6/1970 Netherlands .

Primary Examiner—Robert B. Reeves
Assistant Examiner—Douglas D. Watts
Attorney, Agent, or Firm—Ostrolenk, Faber, Gerb & Soffen

[57] ABSTRACT

An apparatus for the thermal treatment of commodities packed in containers, such as tins or glass jars, comprises a treatment chamber or space through which a conveyor travels in a loop-shaped path, which path extends outside this chamber. The conveyor consists of two chains, located at some distance from and parallel with each other, each chain consisting of link plates and pivot pins. Each pair of opposite links from both chains carries a supporting plate which is curved in cross section and fastened upon an extended portion of a respective link of both chains, two adjacent plates forming a carrier for the temporary receipt of sheaths, filled with sticks of containers. Carriers are loaded and unloaded in one single operation by a loading and an unloading station, disposed within the path of travel of the conveyor, but outside the treatment chamber, additional means being provided at the location of said stations for filling and emptying the sheaths with containers.

7 Claims, 8 Drawing Figures

CONVEYING APPARATUS

BACKGROUND OF THE INVENTION

1. Field of the Invention

The present invention relates to a conveying apparatus, and more particularly to a conveyor for apparatus for the thermal treatment of commodities packed in containers, such as apparatus for sterilizing or pasteurizing foodstuffs packed in tins or glass, said conveyor comprising means for conveying a flexible conveyor along a closed path of travel and carriers for containers to be treated, a unit being present along the path of travel for loading said carriers with said containers to be treated and a unit for unloading treated containers from said carriers.

2. Description of the Prior Art

In preserving industries it is known to continuously convey a packed product to be treated through a space secluded from ambient air, a pronounced difference in temperature and/or pressure and/or degree of moisture being maintained within said space, with respect to said ambient air, so as to increase the keeping qualities of the respective treated product. This is especially the case with foodstuffs or medicines.

In the prior art apparatus, many embodiments of which have been used, the respective containers are mostly fed one by one or groupwise to carriers, so as to subsequently subjected to the relative thermal treatment, whilst a discharge of treated containers takes place correspondingly.

The difficulty with an apparatus of this type is that its productive capacity is rather limited, due to the time-consuming manner in which containers are loaded and unloaded.

SUMMARY OF THE INVENTION

In view of the foregoing factors and conditions of the prior art it is a primary object of the present invention to provide a novel system for the respective loading and unloading operations, in which each carrier is fed with a large number of containers to be treated, within a very short period of time, an unloading of said carriers also being performed rapidly.

According to the present invention this object is attained in that the loading unit is provided with means for forming sticks of containers or in that the loading unit interacts with means for forming sticks of containers, said unit further comprising means for pushing one or more sticks into one or more sheaths, additional means being provided for loading each carrier from one side with at least two sheaths in one single operation and for unloading the respective carriers in a similar manner.

Due to loading or unloading each carrier with two or more sheaths, the period of time required for such an operation, may be considerably reduced. Filling and emptying the relative sheaths takes place outside the treatment apparatus proper, so that no delay in the productive capacity of said apparatus will occur. It will be obvious from the foregoing that the system in accordance with the present invention allows a control, which is more practical and safer than in prior art systems known so far.

The present invention is specifically embodied in apparatus provided with a conveyor which comprises two chains built up from link plates and pivotal pins, said chains being arranged at some distance parallel with each other. A carrier is always located between two opposite link plates of both chains said carrier, together with an adjacent carrier forming a compartment for temporarily receiving the respective sheaths. Apparatus of this type is a so-called frontloader. According to the present invention each carrier consists of a supporting plate curved in cross section, which is fastened upon an extended portion of the link plate concerned, while the center of the radius of curvature of said supporting plate practically coincides with the center line of the most remote pivotal pin of the respective link and near one side of each supporting plate at least one abutment is provided for limiting the displacement of sheaths in the enclosed compartment(s).

Due to this combination of features the location at which the carriers are positioned is staggered with respect to the pivotal pins of the matching chain link. This causes the curved supporting plates to describe a radius around the sheaths located thereunder when passing any curves, so that said sheaths remain enclosed and the risk of jamming is prevented. An important consequence thereof is that the pitch of the chain links may be considerably reduced, so that a very favorable loading degree per unit of length of the chain is obtained.

The curved supporting plates interact with the abutments, in order to completely enclose the respective sheaths, said operation ensuring that the sheaths are also fully enclosed when they have to pass any curves.

The present invention is more specifically, embodied in apparatus, the treatment space of which is partly filled with liquid. In an apparatus of this type containers are subject to the influence of the Archimedean principle, whereby a relative reduction in weight occurs such, that the said containers tend to "swim" out of the carriers. The latter is avoided in accordance with the present invention in that a closing plate is disposed transverse to each supporting plate on the convex side thereof, near the fastened end of each supporting plate, whilst the abutments for stopping the sheaths are fastened to the inside of said closing plates.

It is observed that apparatus for thermally treating products in closed containers is known in the art. Said apparatus comprises basket-shaped sheaths being entrained in the conveyor by means of pins or fingers, which are fastened upon the link plates of the conveying chain. This known apparatus has the drawback that the traveling velocity (and therefore the productive capacity) is defined by the period of time, required for loading and unloading the sheaths. Extending this time (as is the case in the present invention) would involve a direct unfavorable effect upon the productive capacity of said known apparatus. The latter apparatus has the further drawback that only a very limited loading degree per unit of length of the chain is obtained.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF A PREFERRED EMBODIMENT

In order to best understand the present invention a description of a preferred embodiment thereof is provided accompanied by drawings. Initially referring to FIG. 1 the apparatus according to the present invention consists of a housing 1, comprising a treatment space 2. The interior of said space 2 is provided with return wheels 3, for guiding a flexible conveyor 4, comprising carriers 5. Said conveyor 4 enters space 2 through a sealing passage 6, in this case a vertical column filled with liquid. A similar sealing passage 7 serves as a liquid lock, via which the conveyor 4 may leave the treatment space 2. Said treatment space 2 is partly filled with liquid, in this case water and further comprises means 8 for exerting and maintaining a temperature of more than 100° C. within said space 2. In this manner a pressure will be exerted in space 2, which at least equals the vapor pressure of the liquid applied, i.e. of the water. The level difference H between the liquid in space 2 and in columns 6 and 7, substantially corresponds to the pressure difference between the interior of the treatment space and the ambient air. The top of housing 1 comprises an inlet 41 for pressurized gas (mostly air) and an inlet 42 for steam. Said top further comprises spray nozzles 43 which receive liquid from a bath at the bottom of space 2 through a conduit 44, by means of a pump 45. This spary action will improve the heat transfer aimed at.

Figure 1:
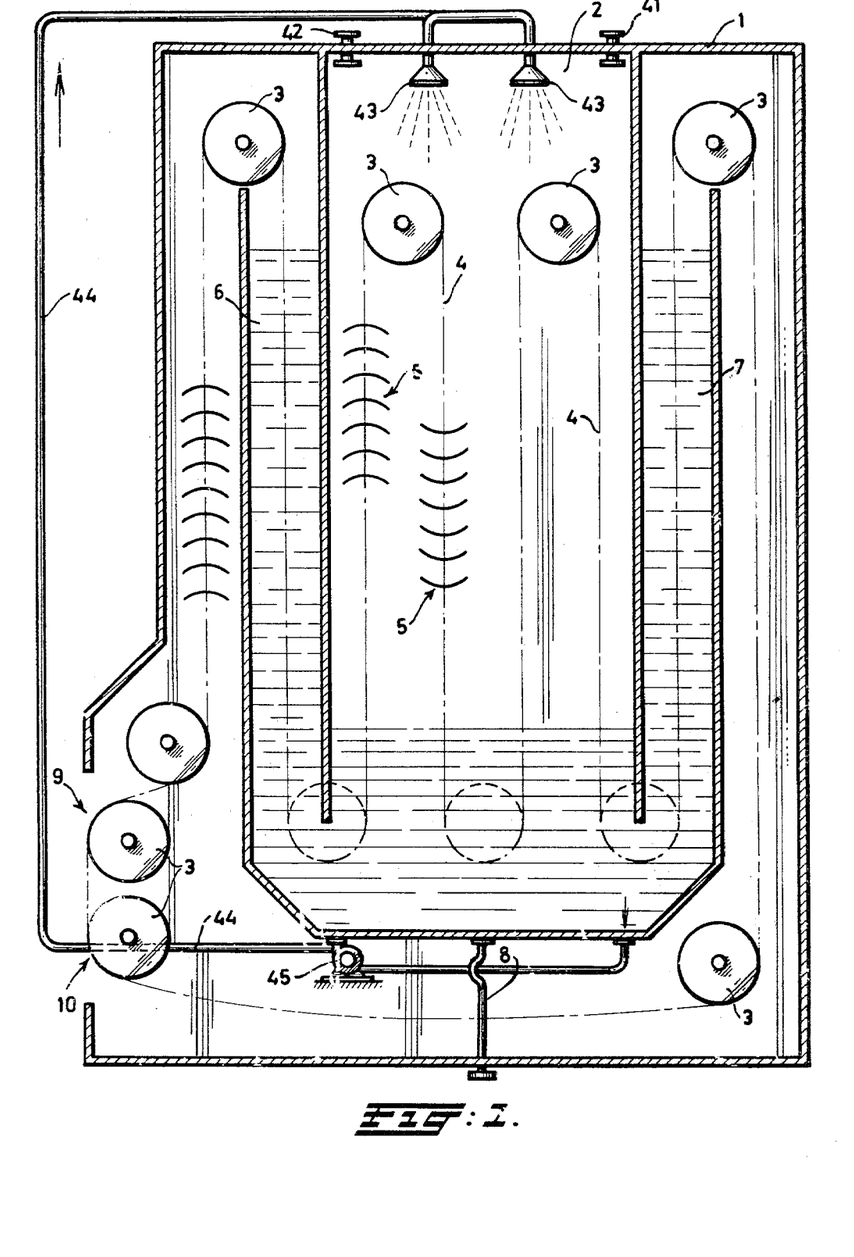
FIG. 1 is a vertical cross section of a sterilizing and pasteurizing apparatus.

Outside space 2 carriers 5 are loaded at a unit 9, whilst at unit 10 these carriers are unloaded. The conveyor 4 is an endless conveyor and part of the path to be traveled is located below housing 1.

Figure 6:
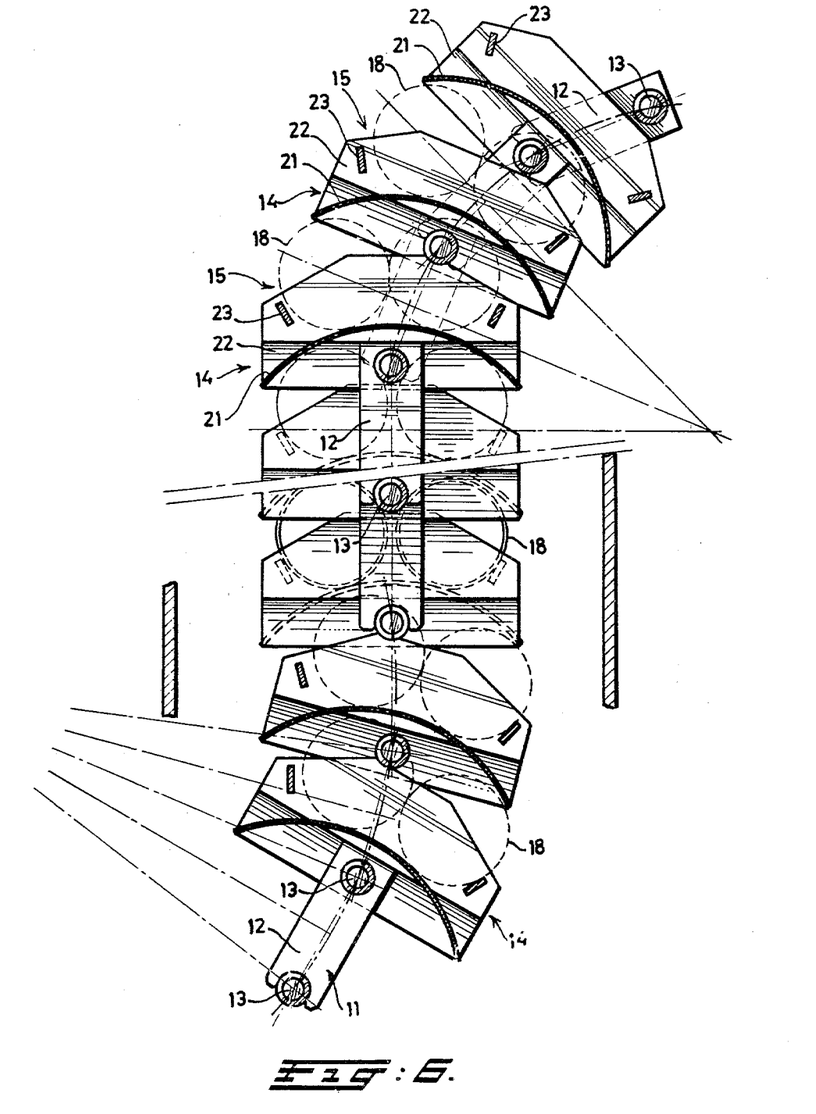
FIG. 6 is a cross section on an enlarged scale of part of the conveyor of FIGS. 1 and 2A, 2B.

The conveyor consists of two chains 11 (see FIG. 6), located at some distance from one another and running parallel with each other; said chains being built up from link plates 12 and pivotal pins 13. A carrier 14 is always disposed between two opposite link plates 12 of the two chains 11, said carrier 14, together with an adjacent carrier forming a compartment 15 for temporarily receiving sheaths to be treated (see FIGS. 2A and B and FIG. 6).

The construction of the above described apparatus does not differ so far from apparatus known in the art, such as is disclosed for example in U.S. Pat. Nos. 3,704,774, 3,970,188 and 3,986,832.

Figure 2A:
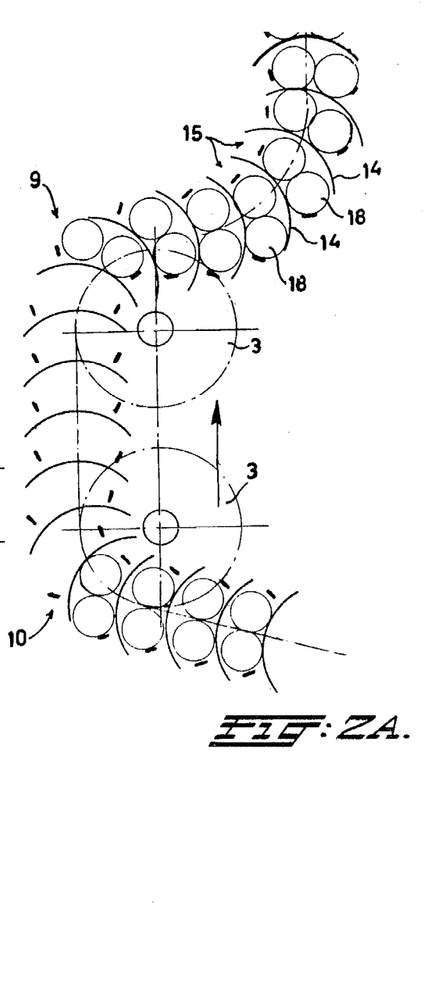
FIGS. 2A and 2B show on an enlarged scale two variants of the loading and unloading steps.
Figure 2B:
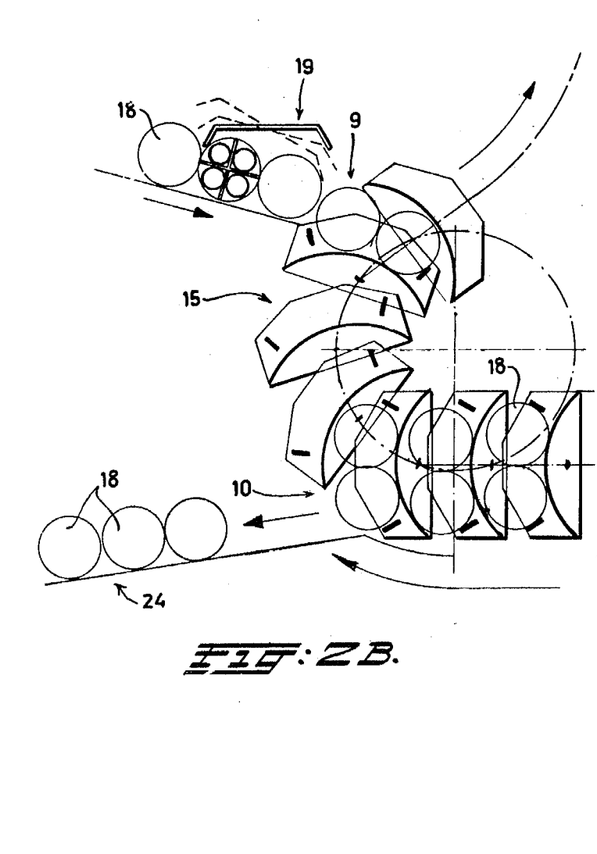
Figure 3:
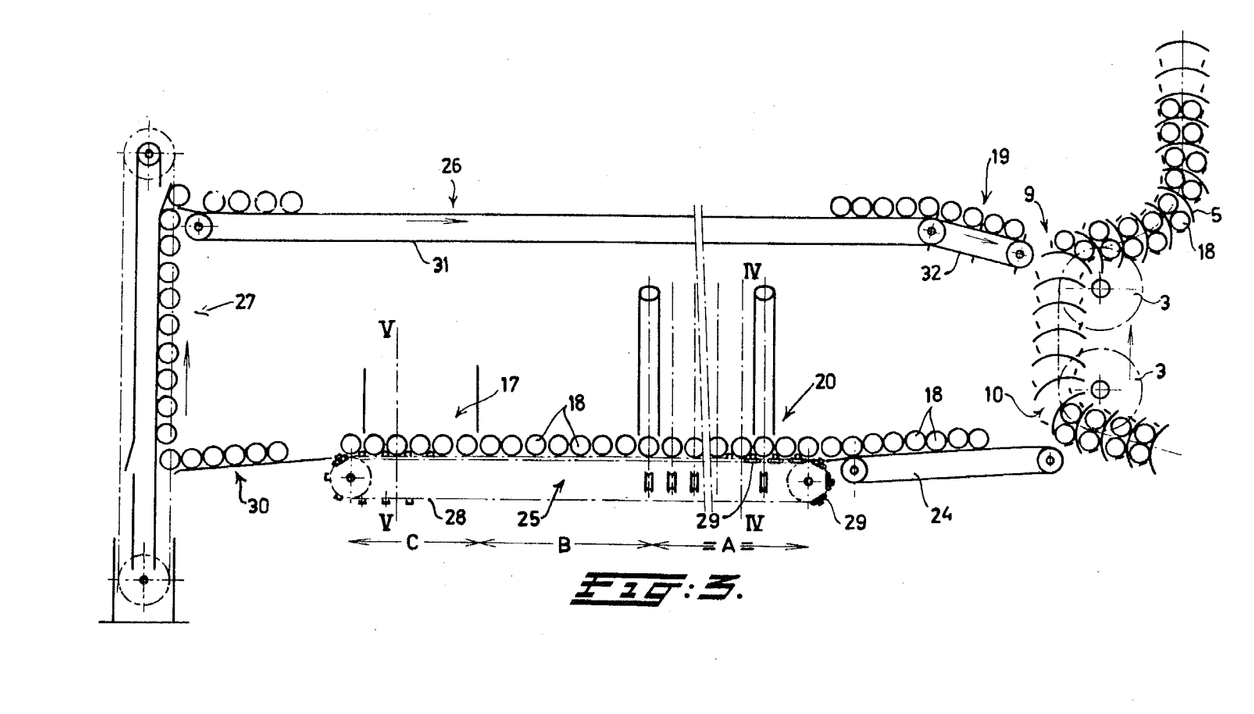
FIG. 3 is a view of the path to be traveled by the sheaths fron an unloading toward a loading unit.

Referring now to the combined FIGS. 2A and 2B and 3, the loading unit 9 interacts with means 17 for forming a number of sticks of containers 16 and for pushing said sticks into a corresponding number of sheaths 18. The loading unit 9 further comprises means for a one-sided loading (with respect to the conveyor) of each carrier 5 with at least two sheaths 18 in one single operation. The unloading unit 10 comprises means 20 for emptying a number of sheaths 18 in a corresponding manner. Said means 20 convey empty sheaths 18 to a point, at which the means 17 refill said sheaths 18 with sticks of containers 16. The wall of the sheaths 18 comprises apertures for the passage of liquid in space 2.

Each carrier 5 consists of a supporting plate 21, curved in cross section, said plates being fastened to an extended part of a respective link plate 12. The center of the radius of curvature of said plates substantially coincides with the center of the most remote pivotal pin 13 of the relative link. A closing plate 22 is mounted transverse to each supporting plate 21 on the convex side thereof and near the fastened end of each supporting plate. Two abutments 23 are fixed in the interior of the said plate 22 in order to keep the sheaths 18 inside the respective compartment 15 (see FIG. 6).

Referring again to FIGS. 2A and 2B, loading unit 9 is located above unloading unit 10, said lower unit 10 interacting with a discharge conveyor 24 which continuously catches sheaths 18 leaving each compartment 15 and conveys said sheaths to a circuit (see FIG. 3), which circuit serves for emptying and refilling the said sheaths and for conveying loaded sheaths to loading unit 9. Said circuit substantially consists of two parallel superimposed parts 25 and 26, whereinbetween a connecting lifting conveyor is disposed. The lower part 25 substantially consists of three regions A, B and C, wherein region A serves for emptying sheaths 18 (see for an elucidation hereof, FIG. 4). Region B is a transitional region, whilst in region C sticks of containers 16 are formed with respect to filling sheaths 18 (see FIG. 5). Said lower circuit part 25 further comprises an endless conveyor 28, which is built up from spaced parts 29, by means of which the sheaths 18 can be directed accurately in regions A and C. Said conveyor 28 is driven step by step, each displacement covering a distance of e.g. eight to twelve sheaths 18.

After having emptied the sheaths in region A and having refilled said sheaths in region C, an operation which will be explained hereinafter as yet, the filled sheaths 18 are conveyed to a sloping collection point 30, adjoining the lifting conveyor 27. At said location 30 the sheaths 18 are entrained one by one and redelivered at the upper circuit part 26, which consists of an endless conveyor 31, adjoining a metering conveyor 32, which continuously catches two sheaths 18 and delivers said two sheaths 18 to loading unit 9.

Emptying sheaths in region A of the lower circuit part 25 is performed by means 20 which slopingly position a number of sheaths 18, for example 8 to 12 sheaths simultaneously. The sticks of containers 16 within the sheaths 18 will subsequently slide upon an adjoining conveyor 33, whereupon they arrive upon a discharge conveyor 35, via a lifting device 34. Said lifting device 34 changes the horizontal position of the containers upon conveyor 33, into a vertical position upon conveyor 35. The conversion is essential with respect to the further handling of said containers, to wit packing and transporting them.

Figures 4, 5:
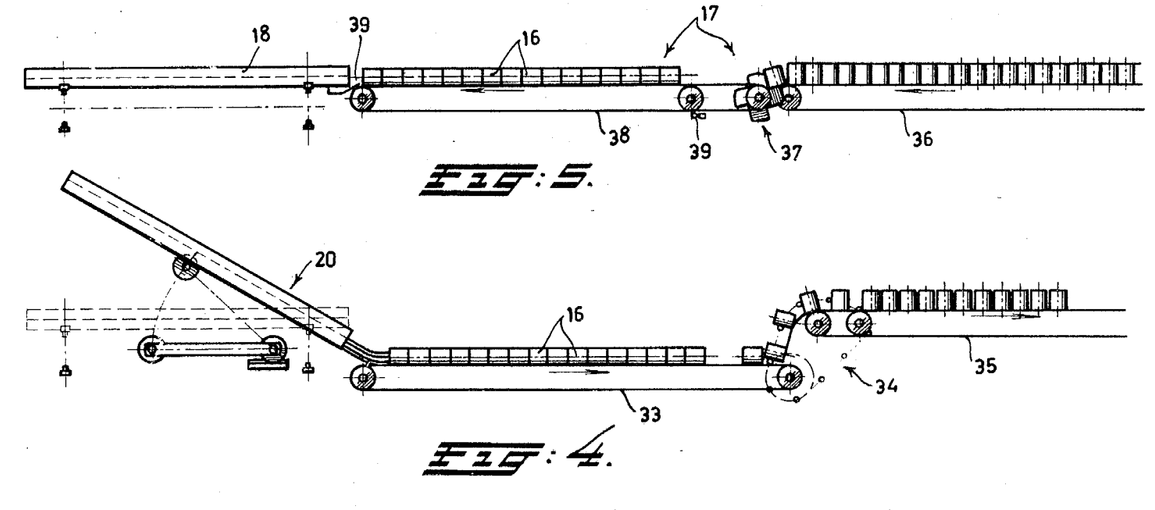
FIG. 4 is a horizontal cross section according to line IV—IV in FIG. 3, showing the unloading and the discharge of treated containers.
FIG. 5 is a cross section on an enlarged scale according to line V—V in FIG. 3, showing the filling of sheaths.

Referring now to FIG. 5 the manner is shown in which sheaths 18 are filled with sticks of containers 16 in region C. The upright containers are being supplied through a conveyor 36 and subsequently to a conveyor 38 through a rotary wheel 37, which simultaneously converts the upright position of the containers into a horizontal position. Simultaneously eight to twelve rows of adjacent containers are supplied, thus causing an equal number of sticks to be formed upon the conveyor 38. An abutment 39 halts said sticks until the right moment of filling the available sheaths 18, is due. During said filling operation, conveyor 28 is at a standstill. After having completed said filling operation, conveyor 28 conveys the filled sheaths to collection point 30, as described hereinbefore.

In the apparatus according to the present invention, the loading unit 9 and the unloading unit 10 comprise return wheels 3, which are smaller than those within the housing 1. Because of the latter feature an opening between the curved supporting plates 21 and the abutments 23 can be arranged such, that the sheaths 18 may enter the compartments 15 (loading unit 9) pairwise or leave said compartments (unloading unit 10) in a corresponding manner. Said method of loading and unloading sheaths 18 demands a very short period of time, thus permitting a considerable traveling velocity of the conveyor 4 and consequently an enlarged productive capacity of the treatment apparatus in accordance with the present invention. The present system also causes a higher degree of loading per unit of length of the conveyor to be performed, which likewise increases the productive capacity of the present apparatus. Naturally the sheaths 18 are provided with ample apertures so as to ensure a good flowing velocity of fluid to be applied in this procedure, i.e. water and a mixture of steam and air.

The length of the supporting plates 21 is limited, as said plates need not extend along the entire length of the compartment(s). The two chains 11 may be interconnected by means of coupling rods (not shown) in case that they should be kept at correct distances from each other. The combination of supporting plates 21 with closing plates 22 and abutments 23 according to the present invention has a fourfold function:

1. The supporting edges formed by the supporting plates 21 are such, that at least two sheaths 18 may be supported by said edges.
2. The closing plates 22 prevent the sticks of containers 16 from a sidewise slipping out of the sheaths 18.
3. The sheaths 18 are kept enclosed completely during their entie path of travel through space 2, even when passing curves along the return wheels 3.
4. The staggered position of the supporting plates 21 upon the extension of the link plates 12 prevents an inadmissible constriction of each compartment 15 during its passing a return wheel 3.

Figure 7:
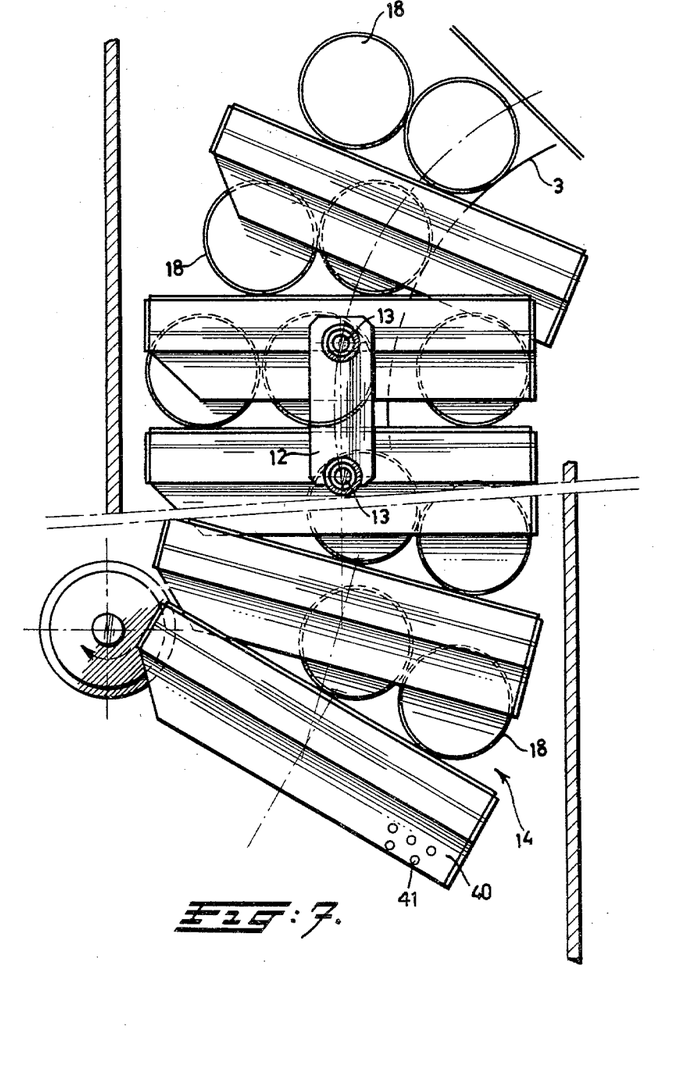
FIG. 7 is another embodiment of the carriers of the conveyor.

FIG. 7 is a variant of an embodiment in accordance with the present invention, wherein each carrier consists of a flat box 40, five walls of which being perforated shown at 41 for illustrative purposes. Said box 40 is likewise fastened upon an extended part of two opposite link plates 12. Carriers of this shape may simultaneously accomodate three sheaths 18. FIG. 7 further shows that one front wall of box 40 is shorter than the other front wall. This measure enables an unimpaired loading of sheaths 18 in one curve and prevents an undesired fall-out of sheaths 18 in another curve.

Some products to be sterilized or pasteurized should preferably be agitated during the respective procedure or in a certain part of the treatment space, so that a more intensive transfer of heat will occur or a burning of said products or other disagreeable results, is or are prevented. In order to obtain the above favorable effect a provision known per se may be employed.

It is observed that the foregoing describes loading and unloading the present apparatus through the frontside of the respective carriers. The scope of the present invention also allows, however, a system of loading and unloading via an extremity of the respective carriers, such as is known for example from U.S. Pat. No. 3,970,488. The latter Patent also discloses the formation of sticks of containers (tins). According to the present invention, said sticks are first slid into a sheath 18, whilst two or more sheaths 18 are subsequently pushed into a carrier. The specific principle of the present invention consists however in that the carriers are loaded grom one side. Said wording "from one side's should be understood as "with respect to the conveyor".

It is furthermore observed that each sheath 18 may also be filled with two or more sticks of containers 16, which sticks may be separated from one another by means of partitions (see FIG. 2B).

What is claimed is:

1. Conveying apparatus for the thermal treatment of commodities packed in containers, said conveying apparatus comprising an elongate, flexible conveyor and means for conveying said flexible conveyor along a closed path of travel, carriers for containers to be treated being attached to said flexible conveyor at spaced intervals therealong for moving therewith, at one location along said path of travel is a loading unit for loading a said carrier with containers to be treated as said carrier moves past said loading unit and at a second location spaced from the one location is an unloading unit for unloading treated containers from a said carrier as that said carrier moves past said unloading unit, said loading unit comprising means for forming sticks of containers and means for pushing a said stick into a sheath, and loading means at one side of said conveyor for loading each carrier in one single action from said one side of said conveyor with at least two sheaths and said unloading unit comprising means for unloading the at least two sheaths from each said carriers in one single action from one side of said conveyor.

2. Conveying apparatus according to claim 1, wherein said conveyor is comprised of two chains, built up from link plates which are arranged in a lengthwise array and pivotal pins at the opposite ends of said link plates for joining adjacent said link plates, said chains being spaced at some distance from and parallel with each other, each said carrier being accommodated in between two opposite link plates of the chains, each said carrier forming a compartment with an adjacent said carrier for temporarily receiving at least two of the sheaths, wherein each said carrier is comprised of a supporting plate which is curved in cross section with a curvature oriented to hold at least two sheaths next to each other across said conveyor, each said carrier being fastened upon an extended portion of the respective said link plates, the center of the radius of curvature of said supporting plates practically coincides with the center of the most remote said pivotal pin of the respective said link; and at least one abutment being provided near one face of each supporting plate for limiting the displacement of sheaths within the enclosed said compartment.

3. Conveying apparatus according to claim 2, wherein a closing plate is provided near the end of each said supporting plate at a respective said link plate, said closing plate being transverse to said supporting plate and being located at the convex side of said supporting plate, abutments for abutting the sheaths are fastened against the interiors of said closing plates.

4. Conveying apparatus according to claim 1, wherein said unloading unit for unloading sheaths interacts with means for slopingly positioning a plurality of sheaths and for conveying the empty sheaths to a collecting point.

5. Apparatus according to claim 2, wherein said box is fastened upon an extended part of two opposite link plates.

6. Conveying apparatus according to claim 1, wherein said carriers are shaped so that adjacent said carriers along said conveyor form a compartment for receiving at least two sheaths between the said adjacent carriers; said carriers being pivotally supported to said conveyor such that upon deflection of said conveyor at a pair of adjacent carriers, they are pivoted to open up the space between them for loading or unloading of sheaths; and said conveying means for said conveyor including means for deflecting said conveyor at said loading unit and again at said unloading unit for loading and unloading of the sheaths between adjacent said carriers.

7. Apparatus according to either of claims 1 or 6, wherein each said carrier comprises a box with perforated walls and means for temporarily enclosing sheaths.

* * * * *